Oct. 18, 1966  H. A. SCHREIBER  3,279,761
AUTOMATIC TENSIONING ASSEMBLY
Filed Sept. 16, 1965  5 Sheets-Sheet 1

INVENTOR
HARRY A. SCHREIBER, DECEASED
BY RAE SCHREIBER, EXECUTRIX
BY Mason, Fenwick & Lawrence
ATTORNEYS

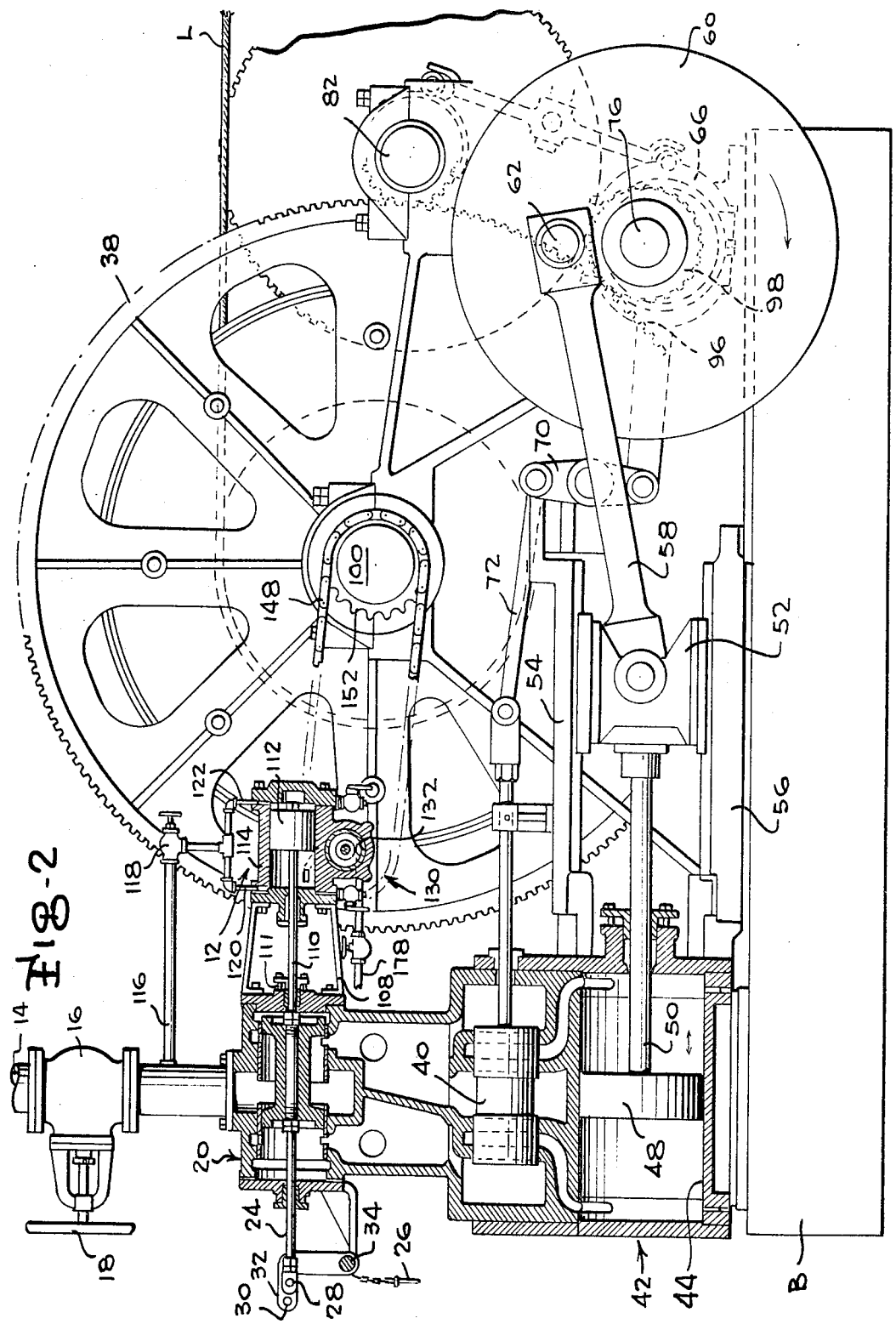

Oct. 18, 1966 H. A. SCHREIBER 3,279,761
AUTOMATIC TENSIONING ASSEMBLY
Filed Sept. 16, 1965 5 Sheets-Sheet 3
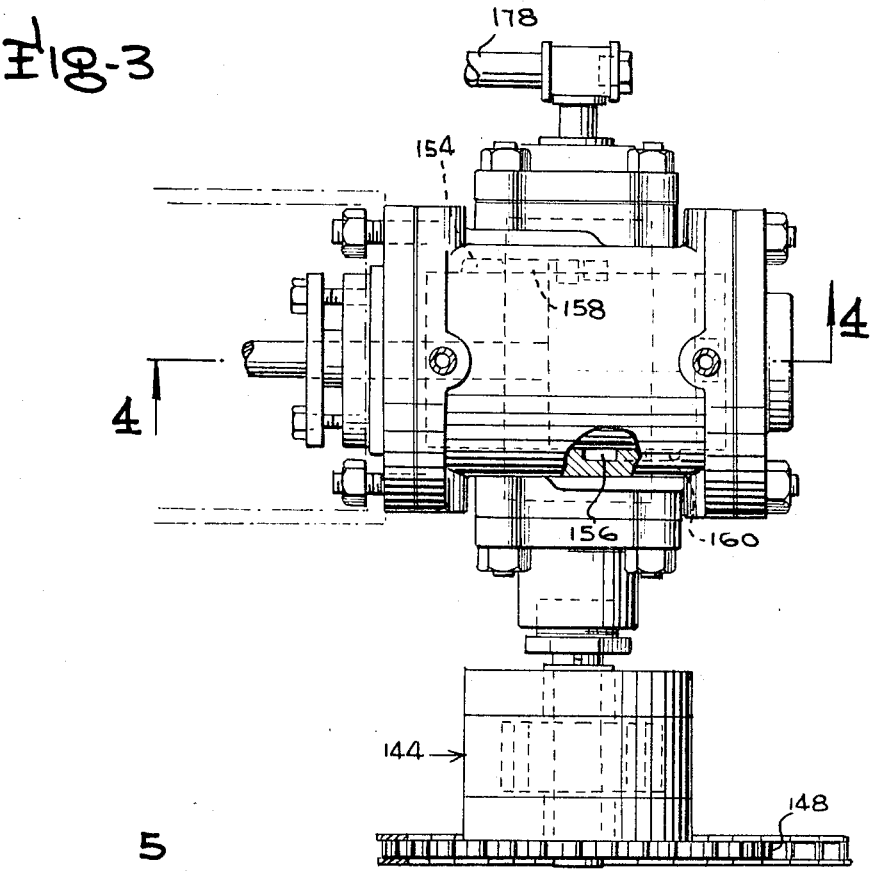
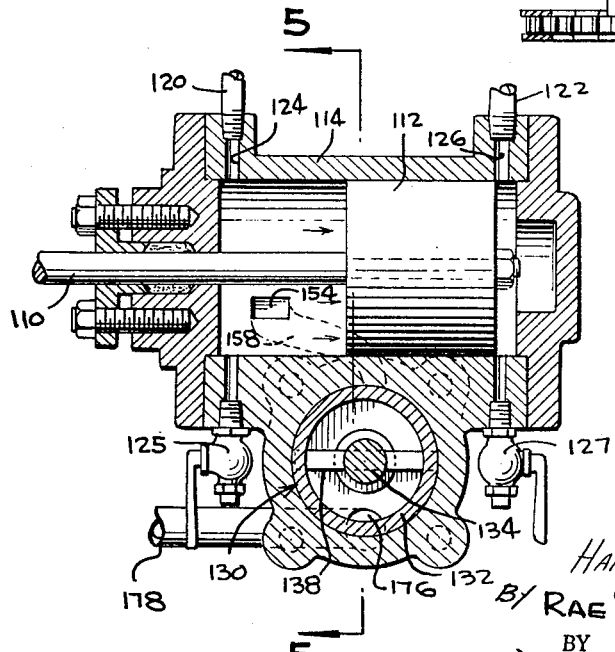
INVENTOR
HARRY A. SCHREIBER, DECEASED,
BY RAE SCHREIBER, EXECUTRIX
BY Mason, Fenwick & Lawrence
ATTORNEYS

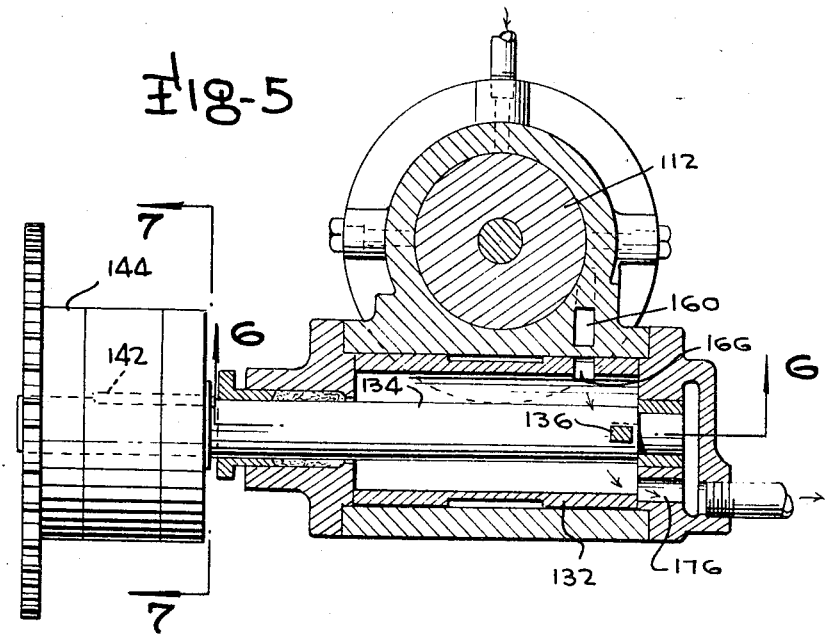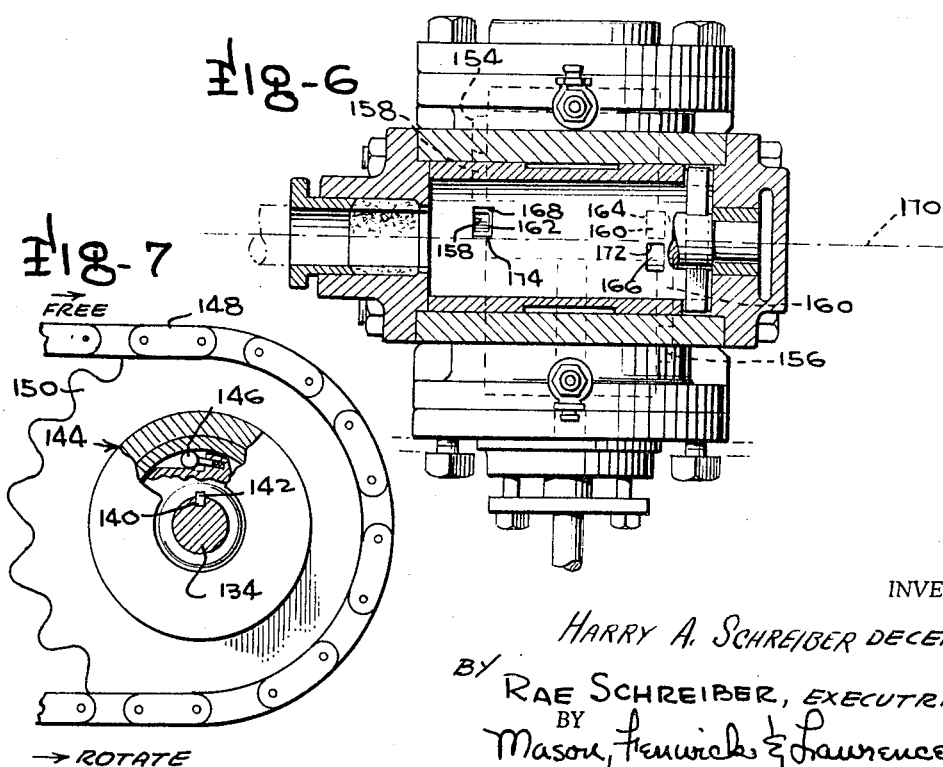

INVENTOR
HARRY A. SCHREIBER, DECEASED
BY RAE SCHREIBER, EXECUTRIX
BY Mason, Fenwick & Lawrence
ATTORNEYS United States Patent Office 3,279,761
Patented Oct. 18, 1966

3,279,761
AUTOMATIC TENSIONING ASSEMBLY
Harry A. Schreiber, deceased, late of Nassau County, N.Y., by Rae Schreiber, executrix, Hempstead, N.Y., assignor to J.T. Industries, Inc., Hoboken, N.J., a corporation of New Jersey
Filed Sept. 16, 1965, Ser. No. 487,932
14 Claims. (Cl. 254—172)

This invention relates generally to automatic tensioning devices. More particularly, the present invention relates to an automatic tensioning assembly for use in maintaining the desired tension in mooring lines and hauling lines operated by a winch drum.

In mooring a vessel alongside a dock or wharf, it is normal practice to utilize a conventional winch to maintain the vessel snubbed to the dock. This has been the standard procedure for many years on all types of large vessels; however, to be effective the tension on a winch line must be adjusted for the rise and fall of the tides, or simply the loading and unloading of the vessel, any one of which produces vertical or horizontal movement relative to the dock. In the past it has been the duty of the officer of the deck to see that continual adjustments in the tension of the winch line are made by rotating the winch drum in a direction to either take up or pay out the line. It is manifest that this duty requires the watchful attention of shipboard personnel and removes them from other duties.

Accordingly, it is one of the objects of the present invention to provide an automatic tensioning assembly for use with winches which automatically senses the tension of the line and maintains the desired line tension irrespective of vertical movement of the vessel being moored.

Another object of the present invention is the provision of an automatic tensioning assembly which is adaptable for use with conventional winches and automatically pays out additional line when the tension in the line rises above a desired maximum and then returns the line to the condition of a predetermined maximum tension.

The present invention also has as an object the provision of an automatic tensioning assembly which permits the winch drum to rotate in a pay out direction a predetermined number of degrees of revolution when the tension in the line exceeds a preselected limit.

A further object of the present invention is the provision of an automatic tensioning assembly which may be readily used with conventional winches by automatically operating the engine reversing volume in a manner that moves the reversing valve to a pay out position only when the tension in the line exceeds the force of the winch engine so the winch drum revolves in a pay out direction and then returns the engine reversing valve to a take up position causing the drum to again exert a tension in the line not exceeding the predetermined tension.

The present invention also has as an object the provision of a rotary valve operable connection to the winch drum to sense movement of the drum in a pay out direction and a double acting piston valve operable by said rotary valve to operate the winch engine reversing valve for controlling the direction of rotation of the drum.

Other objects and advantages of the present invention will become apparent to those skilled in the art from the following description when read in conjunction with the accompanying drawings, wherein:

FIGURE 2 is a cross sectional view in elevation taken along lines 2—2 of FIGURE 1, showing the details of the automatic tensioning assembly and its position relative to the conventional winch drum;

FIGURE 3 is a plan view of the automatic tensioning assembly and its drive mechanism;

FIGURE 4 is a cross sectional view in elevation taken along lines 4—4 of FIGURE 3 and showing the relation of the openings of the fluid conducting machines and the double acting piston valve;

FIGURE 5 is a cross sectional view in elevation taken along lines 5—5 of FIGURE 4, showing the details of the rotary valve and the position of the ports and the fluid conducting means;

FIGURE 6 is a cross sectional view taken along lines 6—6 of FIGURE 5, showing the alignment of one port of the rotary valve and one opening of the double acting piston valve;

FIGURE 7 is a cross sectional view in elevation partly broken away taken along lines 7—7 of FIGURE 6, showing the clutch mechanism for producing movement of the rotary valve only during paying out movement of the winch drum;

Briefly, the present invention relates to an automatic tensioning assembly for use with winches having a drum, a fluid operated engine for rotating the drum, and an engine reversing valve means connected to the engine for directing the flow of fluid to the engine, the assembly comprising a first fluid valve and a housing operably associated with the drum for directional movement with the drum corresponding only to pay out movement of the drum, a second fluid valve which may be a double acting piston and a housing fluidly connected to and operably controlled by the distance moved by the first valve, the second fluid valve being operably connected to reversing valve means to control movement of the latter, a second fluid valve having only first and second positions, the first position corresponding to take up movement of the drum and the first position of reversing valve means maintaining the engine to exert force tending to rotate the drum to take up, the second position corresponding to pay out movement of the drum and the second position of the reversing valve means which directs the engine to drive the drum in pay out position, whereby when tension is exerted on the drum exceeding take up force of the engine on the drum and the drum pays out, the first valve fluidly directs movement of the second valve to the second position and pay out drive position of the reversing valve means, the paying out of the drum continuing until the first valve moves with the drum in pay out direction until the first valve returns to its first position causing take up movement of the drum. Included as one of the facets of the present invention is the pair of ports in the first valve, each port of said pair communicating alternately with an opening on opposite sides of the piston to produce movement of the piston.

Figure 1:
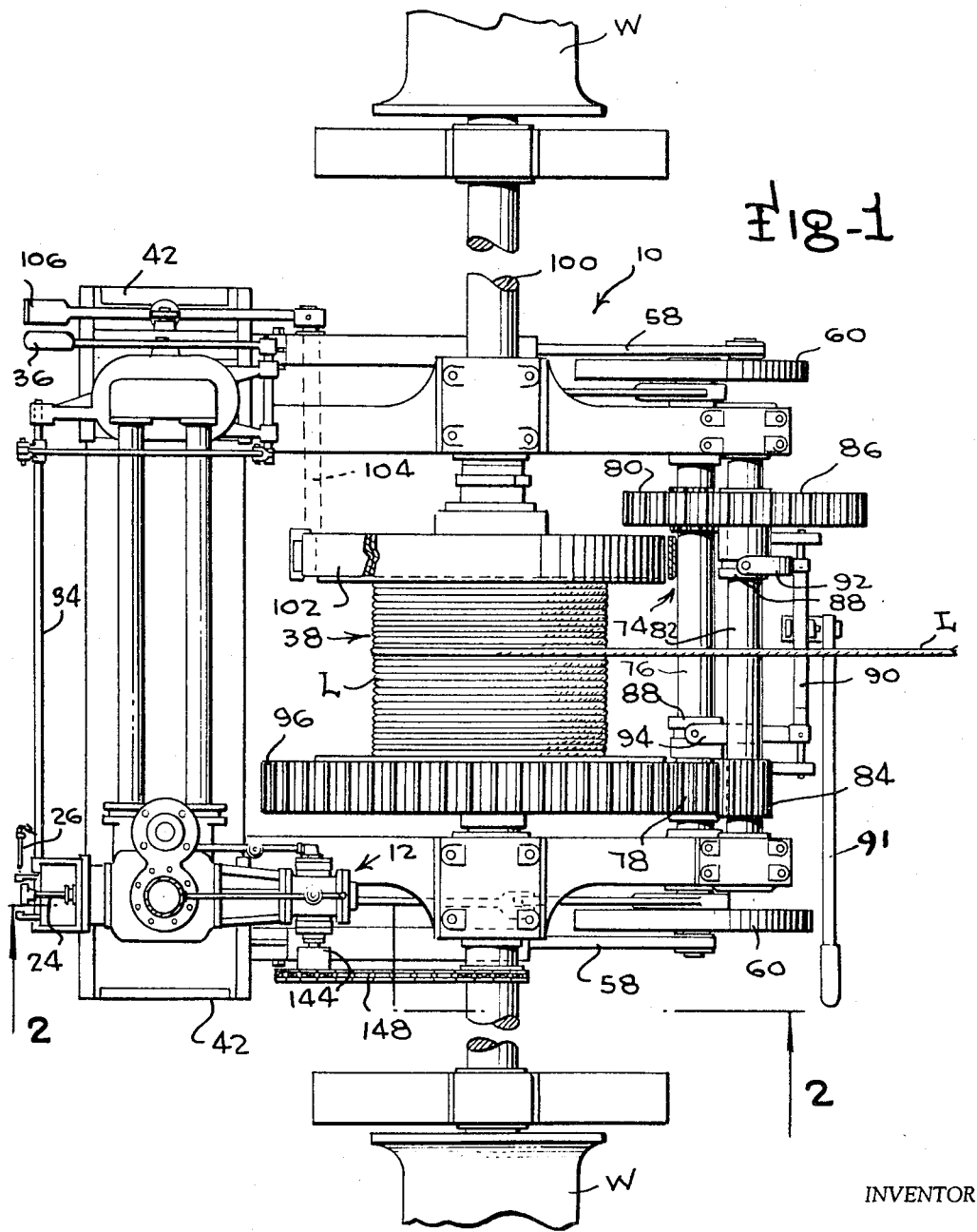
FIGURE 1 is a plan view partly broken away of the overall construction of the winch and the novel automatic tensioning assembly.

The details of the present invention may be readily understood from the following description, and particularly from a study of FIGURES 1 and 2. FIGURE 1 shows generally a steam compound geared winch apparatus, identified by the numeral 10. The winch is essentially entirely conventional, except for its cooperation with the automatic tensioning assembly 12, which is made integral with the movement control assembly of the conventional winch.

Since the winch used with the present invention is conventional, the details of the operation are very familiar to those skilled in the art, and accordingly the major components will be identified in the drawings and described in the following description.

As best shown in FIGURE 2, the winch 10 rests firmly upon a bed B and is secured thereon by any suitable means, such as welding, and the like. The conventional winch is normally steam operated, although air may also be used. Steam from a main steam valve 14 is controlled by master globe valve 16 through wheel 18. The steam flows through valve 16 into the reversing valve or throttle assembly housing 20, which includes the reversing valve 22 operable manually by reversing valve rod 24. When pin 26 is inserted into aligned opening 28 in the reversing valve rod, as well as the opening 30 in crank arm 32 secured to shaft 34, which is rotatable manually through suitable connections by lever 36, as shown in FIGURE 1, the reversing valve 22 operates in the usual manual fashion to control the direction of rotation or movement of the drum 38 through main engine slide valve 40 and the engine 42 having the usual cylinder and double acting piston 48. For this invention it will be assumed, however, that the pin 26 is removed and the reversing valve operated solely and automatically by the automatic tensioning assembly 12, which is connected to the reversing valve. The following description of the invention will be set forth accordingly.

The conventional steam winch normally utilizes pairs of engines 42, as best shown in FIGURE 1, and therefore the details of one engine and the operating connections of the engine and the drum are substantially identical and will be accorded the same identification symbols. The piston 48 is connected to piston rod 50, which is connected to sliding cross head 52, which reciprocates in upper and lower guides 54 and 56. Pivoted to the cross head is connecting rod 58, which operates fly wheel 60 through stub shaft 62. Operably connected to the fly wheel is eccentric 66, secured to which is eccentric rod, which operates rocker arm 70 to control the movement of valve rod 72 of the main engine slide valve 40 in the conventional manner. The fly wheel shaft operates a crank-shaft assembly 74, best shown in FIGURE 1. The crank-shaft assembly includes crank-shaft 76 and spur gears 78 and 80. Operable by the crank-shaft assembly is an intermediate shaft 82 having spur gears 84 and 86. In a conventional manner the spur gears 78 and 86 are operable through jaw clutches 88 to operate additional winch heads or cat heads extended in a manner not shown through extensions of intermediate shaft 82. By means of the clutch shifting shaft 90 and clutch lever 91 operating shifting forks 92 and 94, the revolution of intermediate shaft 82 is controlled, as well as the operation of jaw clutches 88.

The drum 38 is rotated by means of gear 96, secured to the rim of the drum and meshing with pinion gear 98, secured to the crankshaft. The drum 38 has wound around it a cable or line L, which is used for mooring. The drum revolves about drum shaft 100, having the usual outboard winch head W.

Suitable braking is provided on the drum through brake shoe lining 102, operable through brake shaft 104 and brake lever 106 in the usual manner.

Figure 8:
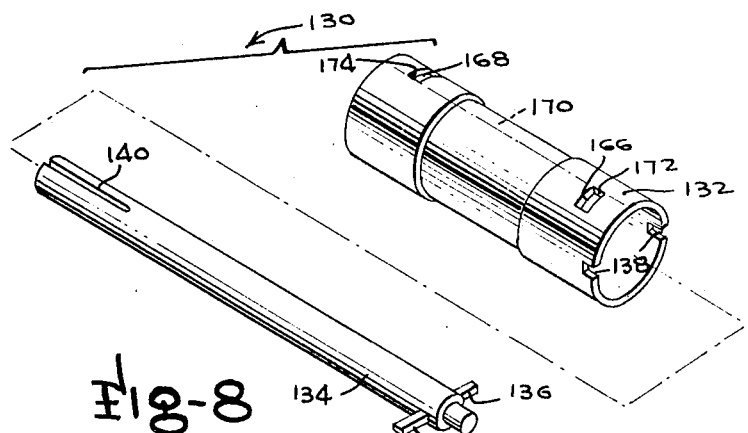
FIGURE 8 is an exploded perspective view of the rotary valve showing the rotary sleeve and the drive rod.

In order to obtain the automatic operation of the reversing valve, in accordance with the present invention, brackets 108 secure the automatic tensioning assembly 12 to the reversing valve housing. In the conventional reversing valve the only rod connected to the reversing valve is rod 24; however, in accordance with the present invention, the operation of the reversing valve 22 is controlled through reversing valve rod 110 with the pin 26 for manual operation removed. The reversing valve rod 110 is secured at one end to the reversing valve 22 through suitable bushing 111 and at the other end to a double acting or drive piston 112, slidable within the piston housing 114. Steam sensing line 116 is taken from the main steam line 14, steam from which passes through globe valve 118 and is divided into a pair of inlets 120 and 122, best shown in FIGURE 4, which convey the steam through channels 124 and 126 respectively. In normal operation of the automatic tensioning assembly, channels 124 and 126 are open to the main steam line. Drain cocks 125 and 127 are suitably positioned at the base of the housing to drain any accumulated liquid. Secured to the piston housing 114 is housing 128 for rotary valve 130, which includes a rotary valve sleeve 132 and drive rod 134 having a T-head formed by extensions 136 adapted to be received in accommodating grooves 138 on the valve sleeve. The valve sleeve 132 fits within housing 128 in a manner to permit free rotation by drive rod 134. The drive rod is suitably slotted at 140, as shown in FIGURE 8, to receive spline 142 in an over-riding clutch 144. The construction of the clutch is conventional and forms no part of the present invention; however, its essential details are disclosed in FIGURE 7, in which it is shown that the operation ball detent 146 urges rotation of the drive rod 134 when chain 148 and complementary sprocket 150 are rotated in the direction of arrow shown. When the chain operates in the opposite direction, as shown by the other arrow, the chain rides freely and does not rotate the drive rod 134. The "free" and "rotate" directions indicated in FIGURE 7 correspond to a take up and pay out direction of rotation of the drum 38. As may be seen from FIGURE 2, the chain 148 is also secured to a sprocket drive 152 secured to the drum shaft 100. Accordingly, it can be seen that when drum 38 rotates in a counter-clock fashion, as shown in FIGURE 2, which is a take up direction for line L, the chain drive 148 rides freely over drive rod 134. In the reverse direction, which is clockwise when viewing FIGURE 2, line L pays out and overriding clutch 144 engages drive rod 134 in order that all paying out rotation of drum 138 may be transmitted to drive rod 134, and accordingly to rotary valve sleeve 132.

The effect of the rotation of the rotary valve sleeve 132 can be readily determined from a study of FIGURES 4, 5, 6, and 9a through 9d.

The porting arrangements and positions of the steam flow through the rotary valve 130 and the piston valve 112 enable the automatic tensioning assembly to operate. As shown in FIGURE 3 and FIGURES 9a through 9d, the housing for the piston valve is provided with an opening 154 on one side and one end of the piston housing and opening 156 on the opposite side and towards the opposite end of the piston housing, best shown in FIGURE 3 and schematically in FIGURES 9a to 9d. Communicating respectively with openings 154 and 156 are passageways 158 and 160, which are constructed as shown and communicate with the interior of the rotary valve housing 128 at passageway openings 162 and 164 respectively, which, as shown in FIGURE 6, are longitudinally aligned. The rotary valve sleeve 132 is provided with complementary sized ports 166 and 168, as best shown in FIGURES 6 and 8. The ports in the rotary valve sleeve are offset from a plane passing through the axis of the valve sleeve and intersecting the circumference of the valve sleeve to form a line represented by line 170, shown in FIGURES 6 and 8. The inner facing edges 172 and 174 of the ports 166 and 168 respectively are substantially contiguous to line 170.

The fluid flow from the rotary valve to the piston valve is through two paths. The first, beginning in the rotary valve, is rotary valve port 166, rotary housing passageway opening 164, and passageway 160 opening in the piston housing 156. The second fluid route in corresponding direction is port 168, rotary valve housing passageway opening 162, passageway 158, and opening in piston housing 154.

The rotary valve housing 128 is provided with an exhaust port 176, to which is secured exhaust outlet 178.

The number of pairs of ports provided in rotary valve sleeve 132 can vary from one pair, as shown, to any number of ports, depending upon the number of pairs of ports distributed symmetrically about the rotary valve sleeve and maintaining the same distance from the ends of the sleeve 132 as the ports now shown, so that in effect such additional ports would constitute a ring of ports around the circumference of the sleeve in which the plane passing through the ports would be perpendicular to the longitudinal axis of the rotary valve sleeve. With respect to each port of each pair, again the ports will be offset from a line similar to line 170. For example, if there are two pairs of ports, the corresponding ports would be 180° around the rotary valve sleeve from the first pair. In the event there are three pairs, each port of each pair would be 120° from the adjacent and corresponding port, or for four pairs there would be a 90° difference, etc. The number of pairs of ports is significant, since it determines the extent of the revolution of the valve sleeve during pay out position before returning to the take up position. With one pair of ports, as illustrated in FIGURE 8, almost a complete revolution is made in the pay out position before the drum is again placed in a take up position. With two, three, and four pairs of ports, etc., in the rotary valve sleeve, the extent of revolution would be ½, ⅓ and ¼ of a revolution, respectively, for each cycle. In other words, it may be stated that the degrees of revolution of the drum is governed by 360/N, where N equals the number of pairs of ports in the rotary valve sleeve 132. The number of pairs of ports is limited only by the size of the rotary valve sleeve; however, normally it would not be expected that there would be more than six pairs of such ports.

A description of the operation of the invention may give further aid in understanding the important aspects. When the mooring line is in operation, the usual winch engine exerts approximately 10,000 p.s.i. pull on the line L having a 9 x 12 winch and about 80 p.s.i. steam line pressure. The normal operation of the winch is to maintain the line in tension and the drum in take up position— that is, when the drum tends to operate in a counter clockwise direction, as shown in FIGURE 2, the movement in the counter clockwise direction is transmitted to chain 148, but drive rod 134 is not rotated, due to the action of the overriding clutch 144. Assuming that the tension in the line L increases above the maximum effective pressure of the engine 42, if, for example, the vessel were being loaded or unloaded, or the tides were such as to raise or lower the vessel, the drum 38 will turn in a clockwise direction, as indicated in FIGURE 2, overcoming the engine 42 and in so doing the drive rod 134 will rotate the rotary valve from the position shown in FIGURE 9B, wherein the pressure on each side of the piston 112 is constant, inasmuch as opening 156 is blocked by the piston 112, and passage of steam through opening 154 is blocked, since, as shown, port 166 in the rotary valve sleeve is out of registry with its corresponding passageway 158. Hence, the steam would not be exhausted into the interior of the rotary valve sleeve for passage out of exhaust port 176. However, as the drum 38 moves into pay out direction, rotary valve sleeve 132 rotates to position 9C, in which it will be seen that the right hand side of the piston 112, as viewed from FIGURE 9C, is under pressure, while the steam pressure at the left hand side of the piston is dumped through opening 154, passageway 158, and port 166 into the interior of the valve sleeve 132 and out exhaust port 178. Immediately upon such reduction in pressure, piston 112 slams to the left to the position shown in 9D, in which case the piston movement is stabilized by the effective pressure on both sides of the piston being constant, due to the fact that port 166 is out of registry with passageway 158. The movement of the piston 112 to the position shown in 9D immediately moves the reversing valve 22 to the left, as viewed in FIGURE 2, causing the engine to operate in the reverse direction to drive the drum 38 in pay out direction.

Figure 9A:
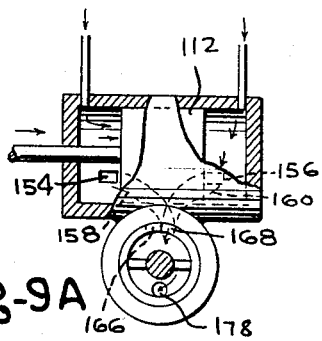
FIGURES 9a through 9d are schematic representations of the positions of the piston valve and the alignment and non-alignment of the ports of the rotary valve and the openings of the piston valve.
Figure 9B:
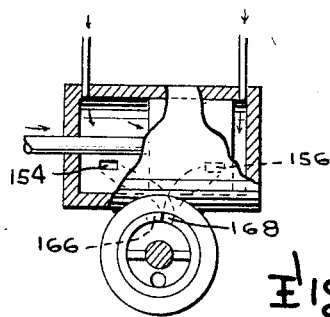
Figure 9C:
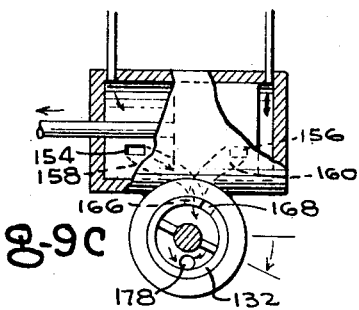
Figure 9D:
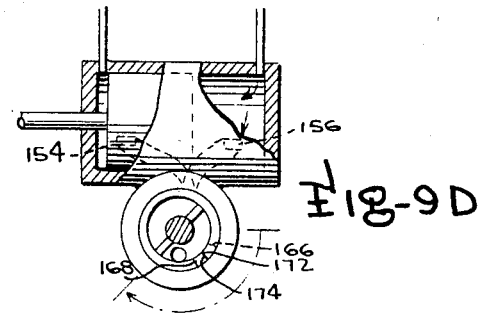

All during the pay out movement of the drum, the chain drive 148 is effective in rotating the drive rod 134 in a manner as shown in FIGURE 9D, so that the rotary valve sleeve continues the rotation until it reaches the position shown in FIGURE 9A, at which time the steam pressure on the right side of the piston is dumped through opening 156, passageway 160, and port 168 and out exhaust port 178, causing the piston 112 to slam to the right, which is a take up position, as shown in FIGURE 9B. Immediately upon the movement of the piston in this direction, opening 156 in the piston housing is blocked by the piston, so that the pressure on each side of the piston is again in equilibrium. When the piston takes the position shown in 9B, the reversing valve 22 through reversing rod 110 is moved to the position shown in FIGURE 2, causing the engine 42 to change direction and move the drum 38 into take up position to again produce tension in the line.

In the construction as shown the operation is such that the drum moves almost a complete revolution in the pay out position. If at the end of such additional line the tension still is above the maximum effective pressure of engine 42, the entire cycle is repeated. The cycles continue until sufficient line is payed out, whereby when the drum is moved to a take up position, the tension in the line does not exceed the maximum effective pressure of the engine. It is to be understood that even if more line were payed out during the payout portion of the cycle, when drum returns to the take up position, the additional slack created in the line will be taken up and wound on the drum, in order to again place the line under the preselected tension. The amount of tension that can be impressed upon the line is obviously determined by the amount of steam pressure admitted to the engine, and this in turn is controlled by the master valve 18. Generally, 80 to 100 lbs. p.s.i. is satisfactory for the usual winch.

What is claimed is:

1. An automatic tensioning assembly for use with winches having a drum, a fluid operated engine for rotating said drum, and engine reversing valve means connected to said engine and directing the flow of fluid to said engine, said assembly comprising: a first fluid valve and a housing operably associated with said drum for directional movement with said drum corresponding only to pay out movement of said drum, a second fluid valve and a housing fluidly connected to and operatively controlled by the distance moved by said first valve, said second fluid valve being operatively connected to said reversing valve means to control the movement of the latter, said second fluid valve having only a first and a second position, said first position corresponding to take up movement of said drum and a first position of said reversing valve means to maintain said engine to exert force tending to rotate said drum to takeup, said second position corresponding to pay out movement of said drum and a second position of said reversing valve means which directs said engine to drive said drum in pay out position, whereby when tension is exerted on said drum exceeding the take up force of said engine on said drum and said drum pays out, said first valve fluidly directs movement of said second valve to said second position and pay out drive position of said reversing valve means, paying out of said drum continuing until said first valve moves with said drum in pay out direction until said first valve returns to its first position causing take up movement of said drum.

2. An automatic tensioning assembly for use with winches having a drum, a fluid operated engine for rotating said drum, and engine reversing valve means connected to said engine and directing the flow of fluid to said engine, said assembly comprising: a first fluid valve and a housing operably associated with said drum for directional movement with said drum corresponding only to pay out movement of said drum, a second fluid valve and a housing fluidly connected to and operatively controlled by the distance moved by said first valve, fluid conducting means operatively connecting said first valve with said second valve, said second fluid valve being operatively connected to said reversing valve means to control the movement of the latter, said second fluid valve having only a first and a second position, said first position corresponding to take up movement of said drum and a first position of said reversing valve means to maintain said engine to exert force tending to rotate said drum to take up, said second position corresponding to pay out movement of said drum and a second position of said reversing valve means which directs said engine to drive said drum in pay out position, whereby when tension is exerted on said drum exceeding the take up force of said engine on said drum and said drum pays out, said first valve fluidly directs movement of said second valve to said second position and pay out drive position of said reversing valve means, paying out of said drum continuing until said first valve moves with said drum in pay out direction until said first valve returns to its first position causing take up movement of said drum.

3. An automatic tensioning assembly for use with winches having a drum, a fluid operated engine for rotating said drum, and engine reversing valve means connected to said engine and directing the flow of fluid to said engine, said assembly comprising: a first fluid valve and a housing operably associated with said drum for directional movement with said drum corresponding only to pay out movement of said drum, a second fluid valve and a housing fluidly connected to and operatively controlled by the distance moved by said first valve, fluid conducting means operatively connecting said first valve with said second valve, said fluid conducting means including at least one pair of ports, said ports being offset in the direction of movement of said first valve, said second fluid valve being operatively connected to said reversing valve means to control the movement of the latter, said second fluid valve having only a first and a second position, said first position corresponding to take up movement of said drum and a first position of said reversing valve means to maintain said engine to exert force tending to rotate said drum to take up, said second position corresponding to pay out movement of said drum and a second position of said reversing valve means which directs said engine to drive said drum in pay out position, whereby when tension is exerted on said drum exceeding the take up force of said engine on said drum and said drum pays out, said first valve fluidly directs movement of said second valve to said second position and pay out drive position of said reversing valve means, paying out of said drum continuing until said first valve moves with said drum in pay out direction until said first valve returns to its first position causing take up movement of said drum.

4. An automatic tensioning assembly for use with winches having a drum, a fluid operated engine for rotating said drum, and engine reversing valve means connected to said engine and directing the flow of fluid to said engine, said assembly comprising: a first fluid valve and a housing operably associated with said drum for directional movement with said drum corresponding only to pay out movement of said drum, said first valve being a rotary valve, a second fluid valve and a housing fluidly connected to and operatively controlled by the distance moved by said first valve, said second valve being a double acting piston valve, said second fluid valve being operatively connected to said reversing valve means to control the movement of the latter, said second fluid valve having only a first and a second position, said first position corresponding to take up movement of said drum and a first position of said reversing valve means to maintain said engine to exert force tending to rotate said drum to take up, said second position corresponding to pay out movement of said drum and a second position of said reversing valve means which directs said engine to drive said drum in pay out position, whereby when tension is exerted on said drum exceeding the take up force of said engine on said drum and said drum pays out, said first valve fluidly directs movement of said second valve to said second position and pay out drive position of said reversing valve means, paying out of said drum continuing until said first valve moves with said drum in pay out direction until said first valve returns to its first position causing take up movement of said drum.

5. An automatic tensioning assembly for use with winches having a drum, a fluid operated engine for rotating said drum, and engine reversing valve means connected to said engine and directing the flow of fluid to said engine, said assembly comprising: a first fluid valve and a housing operably associated with said drum for directional movement with said drum corresponding only to pay out movement of said drum, said first valve being a rotary valve, a second fluid valve and a housing fluidly connected to and operatively controlled by the distance moved by said first valve, said second valve being a double acting piston valve, fluid conducting means operatively connecting said rotary valve with said piston valve, said rotary valve having at least one pair of ports positioned thereon, said second fluid valve being operatively connected to said reversing valve means to control the movement of the latter, said second fluid valve having only a first and a second position, said first position corresponding to take up movement of said drum and a first position of said reversing valve means to maintain said engine to exert force tending to rotate said drum to take up, said second position corresponding to pay out movement of said drum and a second position of said reversing valve means which directs said engine to drive said drum in pay out position, whereby when tension is exerted on said drum exceeding the take up force of said engine on said drum and said drum pays out, said first valve fluidly directs movement of said second valve to said second position and pay out position of said reversing valve means, paying out of said drum continuing until said first valve moves with said drum in pay out direction until said first valve returns to its first position causing take up movement of said drum.

6. An automatic tensioning assembly for use with winches having a drum, a fluid operated engine for rotating said drum, and engine reversing valve means connected to said engine and directing the flow of fluid to said engine, said assembly comprising: a first fluid valve and a housing operably associated with said drum for directional movement with said drum corresponding only to pay out movement of said drum, said first valve being a rotary valve, a second fluid valve and a housing fluidly connected to and operatively controlled by the distance moved by said first valve, said second valve being a double acting piston valve, fluid conducting means operatively connecting said rotary valve with said piston valve, said rotary valve having at least one pair of ports positioned thereon, said second fluid valve being operatively connected to said reversing valve means to control the movement of the latter, said second fluid valve having only a first and a second position, said fluid conducting means including openings in said housing for said second valve, each of said openings fluidly communicating with only one of said ports, said first position corresponding to take up movement of said drum and a first position of said reversing valve means to maintain said engine to exert force tending to rotate said drum to take up, said second position corresponding to pay out movement of said drum and a second position of said reversing valve means which directs said engine to drive said drum in pay out position, whereby when tension is exerted on said drum exceeding the take up force of said engine on said drum and said drum pays out, said first valve fluidly directs movement of said second valve to said second position and pay out position of said reversing valve means, paying out of said drum continuing until said first valve moves with said drum in pay out direction until said first valve returns to its first position causing take up movement of said drum.

7. The assembly of claim 4, including said rotary valve being connected for rotational movement with the shaft of said drum in pay out direction only.

8. The assembly of claim 5, including said ports being mutually offset from and substantially contiguous with plane passing through the longitudinal axis of said rotary valve and between said ports.

9. The assembly of claim 5, including a plurality of pairs of said ports positioned within said rotary valve whereby said drum is permitted to rotate in pay out position at any one time approximately 360/N degrees, where N equals the number of pairs of said ports.

10. An automatic tensioning assembly for use with winches having a drum, a fluid operated engine for rotating said drum, and engine reversing valve means connected to said engine and directing the flow of fluid to said engine, said assembly comprising: a first fluid valve and a housing operably associated with said drum for directional movement with said drum corresponding only to pay out movement of said drum, said first valve being a rotary valve, a second fluid valve and a housing fluidly connected to and operatively controlled by the distance moved by said first valve, said second valve being a double acting piston valve, fluid conducting means operatively connecting said rotary valve with said piston valve, said rotary valve having at least one pair of ports positioned thereon, said ports being mutually offset from and substantially continuous with plane passing through the longitudinal axis of said rotary valve and between said ports, said second fluid valve being operatively connected to said reversing valve means to control the movement of the latter, said second fluid valve having only a first and a second position, said fluid conducting means including openings in said housing for said second valve, each said opening fluidly communicating with only one of said ports, said first position corresponding to take up movement of said drum and a first position of said reversing valve means to maintain said engine to exert force tending to rotate said drum to take up, said second position corresponding to pay out movement of said drum and a second position of said reversing valve means which directs said engine to drive said drum in pay out position, whereby when tension is exerted on said drum exceeding the take up force of said engine on said drum and said drum pays out, said first valve fluidly directs movement of said second valve to said second position and pay out position of said reversing valve means, paying out of said drum continuing until said first valve moves with said drum in pay out direction until said first valve returns to its first position causing take up movement of said drum.

11. The assembly of claim 10, including a plurality of pairs of said ports positioned within said rotary valve whereby said drum is permitted to rotate in pay out position at any one time approximately 360/N degrees, where N equals the number of pairs of said ports.

12. An automatic tensioning assembly for use with winches having a drum, a fluid operated engine for rotating said drum, and engine reversing valve means connected to said engine and directing the flow of fluid to said engine, said assembly comprising: a rotary valve and a housing operably connected to said drum for directional movement with said drum corresponding only to pay out movement of said drum, a double acting piston valve and a housing fluidly connected to and operatively controlled by the distance moved by said rotary valve, said piston valve being operatively connected to said reversing valve means to control the movement of the latter, said piston valve having only a first and a second position, fluid conducting means operatively connecting said rotary valve with said piston valve, said rotary valve having at least one pair of ports positioned thereon, said fluid conducting means including openings in said housing for said second valve, each said opening fluidly communicating with only one of said ports, said first position corresponding to take up movement of said drum, one of said ports and a corresponding opening being out of alignment and the other of said ports being blocked by said piston valve, and a first position of said reversing valve means to maintain said engine to exert force tending to rotate said drum to take up, said second position corresponding to pay out movement of said drum and a second position of said reversing valve means which directs said engine to drive said drum in pay out position, whereby when tension is exerted on said drum exceeding the take up force of said engine on said drum and said drum pays out, said rotary valve fluidly directs movement of said piston valve to said second position by means of alignment of a port with an opening to exhaust fluid from the side of said piston in the direction of said second position and pay out drive position of said reversing valve means, paying out of said drum continuing until said rotary valve moves with said drum in pay out direction until said rotary valve returns to its first position causing take up movement of said drum.

13. An automatic tensioning assembly for use with winches having a drum, a fluid operated engine for rotating said drum, and engine reversing valve means connected to said engine and directing the flow of fluid to said engine, said assembly comprising: a first fluid valve and a housing operably associated with said drum for directional movement with said drum corresponding only to pay out movement of said drum, means including a second fluid valve connected to said first fluid valve for driving said drum in pay out direction a preselected number of degrees of revolution upon movement of said first valve in pay out direction.

14. An automatic tensioning assembly for use with winches having a drum, a fluid operated engine for rotating said drum, and engine reversing valve means connected to said engine and directing the flow of fluid to said engine, said assembly comprising: a first fluid valve and a housing operably associated with said drum for directional movement with said drum corresponding only to pay out movement of said drum, means including a second fluid valve connected to said first fluid valve for driving said drum in pay out direction a preselected number of degrees of revolution corresponding to the rotation of said first valve upon movement of said first valve in pay out direction.

References Cited by the Examiner
UNITED STATES PATENTS

| | | | |
|---|---|---|---|
| 1,455,261 | 5/1923 | Miller | 254—172 |
| 3,231,241 | 1/1966 | Lottermoser | 254—172 |

EVON C. BLUNK, *Primary Examiner.*

H. C. HORNSBY, *Assistant Examiner.*